United States Patent
Inoue et al.

(10) Patent No.: US 8,520,693 B2
(45) Date of Patent: Aug. 27, 2013

(54) DATA PROCESSING APPARATUS, METHOD OF CONTROLLING THE SAME, AND STORAGE MEDIUM STORING PROGRAM

(75) Inventors: Hirowo Inoue, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 13/012,375

(22) Filed: Jan. 24, 2011

(65) Prior Publication Data

US 2011/0202700 A1    Aug. 18, 2011

(30) Foreign Application Priority Data

Feb. 17, 2010    (JP) .................................. 2010-032902

(51) Int. Cl.
*H04L 12/56*    (2011.01)
*H04J 1/16*    (2006.01)

(52) U.S. Cl.
USPC ............................ 370/421; 370/252; 370/405

(58) Field of Classification Search
USPC .................................. 370/419, 252, 421, 405
See application file for complete search history.

(56) References Cited

U.S. PATENT DOCUMENTS

| 2008/0225745 A1* | 9/2008 | Richardson et al. | 370/252 |
|---|---|---|---|
| 2011/0107379 A1* | 5/2011 | Lajoie et al. | 725/87 |

FOREIGN PATENT DOCUMENTS

| CN | 1248745 | 3/2000 |
|---|---|---|
| CN | 1276665 | 12/2000 |
| CN | 1366240 | 8/2002 |
| JP | 63-247858 | 10/1988 |
| JP | 64-23340 | 1/1989 |

OTHER PUBLICATIONS

Chinese Office Action dated Jun. 3, 2013, issued during prosecution of related Chinese application No. 2011-10038530.1 (with whole English translation).

* cited by examiner

*Primary Examiner* — John Pezzlo
(74) *Attorney, Agent, or Firm* — Fitzpatrick, Cella, Harper & Scinto

(57) ABSTRACT

A data processing apparatus which circulates a packet on a ring bus by connecting a plurality of communication modules to the ring bus and causing each communication module to send the packet to an adjacent communication module in synchronism with a predetermined periodical signal includes a plurality of data process modules each connected to a corresponding one of the plurality of communication modules to process data held in the packet, and an input/output module connected to at least one of the plurality of communication modules to receive/output data from/to the communication module. The number of circulations of data through the ring bus, which is input from the input/output module to one of the communication modules, until the data completes a predetermined processing and is received by the input/output module is acquired. The frequency of the periodical signal is changed in accordance with the number of circulations.

10 Claims, 14 Drawing Sheets

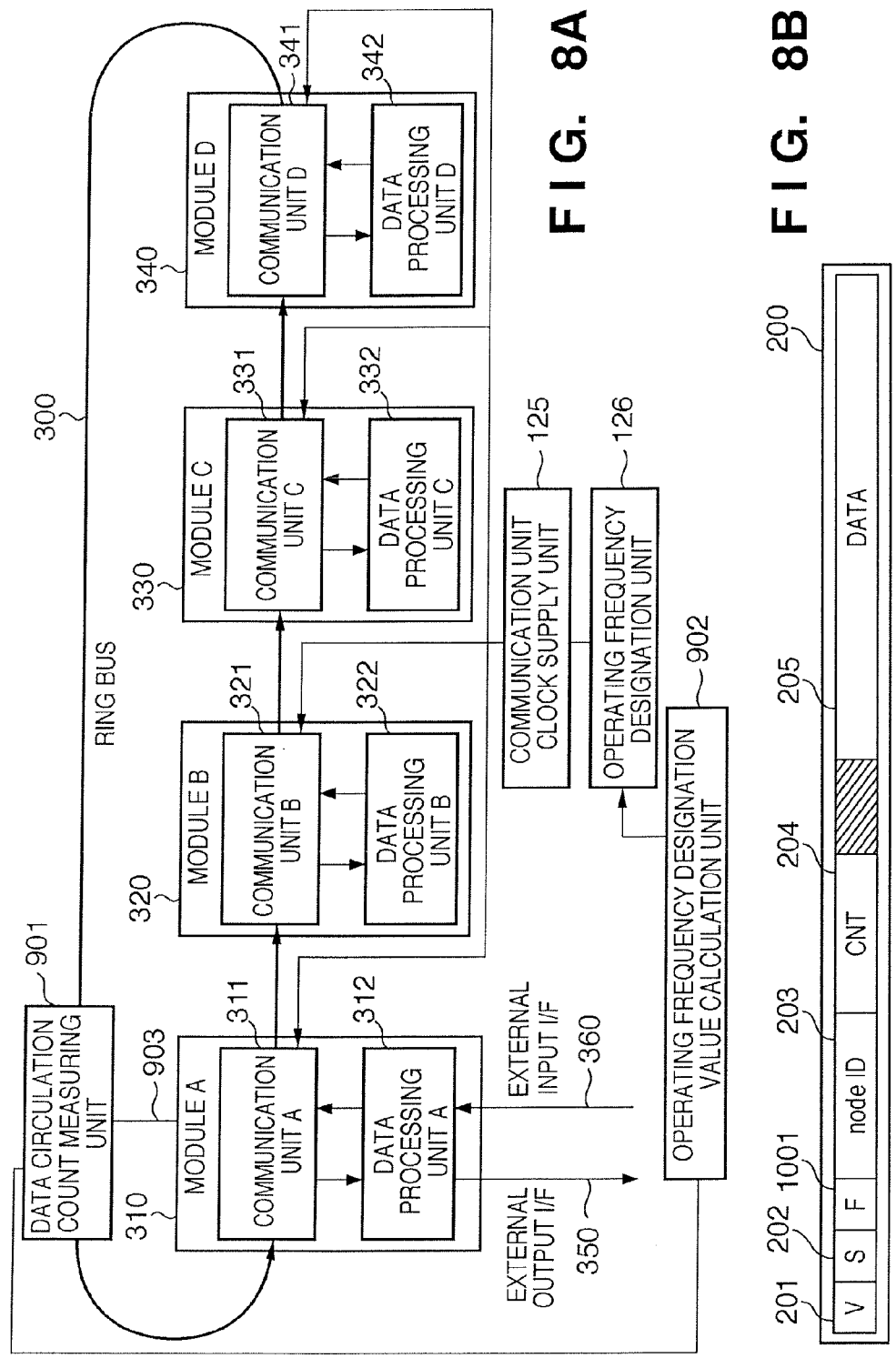

DATA PROCESSING APPARATUS, METHOD OF CONTROLLING THE SAME, AND STORAGE MEDIUM STORING PROGRAM

BACKGROUND OF THE INVENTION

1. Field of the Invention

The present invention relates to a data processing apparatus using a ring bus, a method of controlling the same, and a storage medium storing a program.

2. Description of the Related Art

Conventionally, there exists a data processing method which executes data processing using a bus-type pipeline connection formed by arranging processing circuits in parallel. In this connection scheme, data input from an external memory or an external I/F to the input terminal is processed in the connection order and output from the output terminal to an external memory or the like. In this case, it is impossible to change the process order even if the user wants to.

For this purpose, Japanese Patent Laid-Open No. 01-023340 proposes a method of connecting data processing circuits using a ring bus. Japanese Patent Laid-Open No. 63-247858 proposes a technique of executing image filter processing in parallel. This technique sends data with an attached control code to the ring bus and controls data reception based on the control code so that a plurality of processors can receive the data that overlap in data transfer between the data processing circuits. Various kinds of methods have thus been proposed to change the order in the ring bus.

Conventionally, however, if a data process order that does not comply with the connection order is set in ring bus connection, the data flow in the communication path between process modules in the ring bus may have an overlapping section, and communication of one of the process modules may be forced to wait. In the overlapping section, since the amount of transmission data increases, the performance of the communication process is poor.

SUMMARY OF THE INVENTION

An aspect of the present invention is to eliminate the above-mentioned problems with the conventional technology.

The present invention provides a data processing technique of preventing degradation in process performance even when a data process order not complying with the connection order of the process modules is set in a ring bus.

The present invention in its first aspect provides a data processing apparatus which circulates a packet on a ring bus by connecting a plurality of communication modules to the ring bus and causing each communication module to send the packet to an adjacent communication module in synchronism with a predetermined periodical signal, comprising: a plurality of data process modules each connected to a corresponding one of the plurality of communication modules to process data held in the packet; an input/output module connected to at least one of the plurality of communication modules to receive/output data from/to the communication module; an acquisition unit configured to acquire the number of circulations of data through the ring bus until the data completes predetermined processing and is received by the input/output module, the data being input from the input/output module to one of the communication modules; and a change unit configured to change a frequency of the periodical signal in accordance with the number of circulations.

The present invention in its second aspect provides a data processing apparatus which circulates a packet on a ring bus by connecting a plurality of communication modules to the ring bus and causing each communication module to send the packet to an adjacent communication module in synchronism with a predetermined periodical signal, comprising: a plurality of data process modules each connected to a corresponding one of the plurality of communication modules to process data held in the packet; an input/output module connected to at least one of the plurality of communication modules to receive/output data from/to the communication module; a measuring unit configured to measure an amount of data flowing through the ring bus; and a change unit configured to change a frequency of the periodical signal based on the data amount measured by the measuring unit.

The present invention in its third aspect provides a method of controlling a data processing apparatus which circulates a packet on a ring bus by connecting a plurality of communication modules to the ring bus and causing each communication module to send the packet to an adjacent communication module in synchronism with a predetermined periodical signal, comprising: a plurality of data processing steps of causing data process modules each connected to a corresponding one of the plurality of communication modules to process data held in the packet; an input/output step of receiving/outputting data from/to at least one of the plurality of communication modules; an acquisition step of acquiring the number of circulations of data input in the input/output step through the ring bus until the data completes predetermined processing and is output; and a change step of changing a frequency of the periodical signal in accordance with the number of circulations.

It is possible to suppress degradation in process performance even when a data process order not complying with the connection order of process modules is set in a ring bus.

Further features of the present invention will become apparent from the following description of exemplary embodiments with reference to the attached drawings.

BRIEF DESCRIPTION OF THE DRAWINGS

FIG. 8A is a block diagram showing the arrangement of a ring bus;

FIG. 8B is a view showing the format of packet data;

DESCRIPTION OF THE EMBODIMENTS

Figure 1:
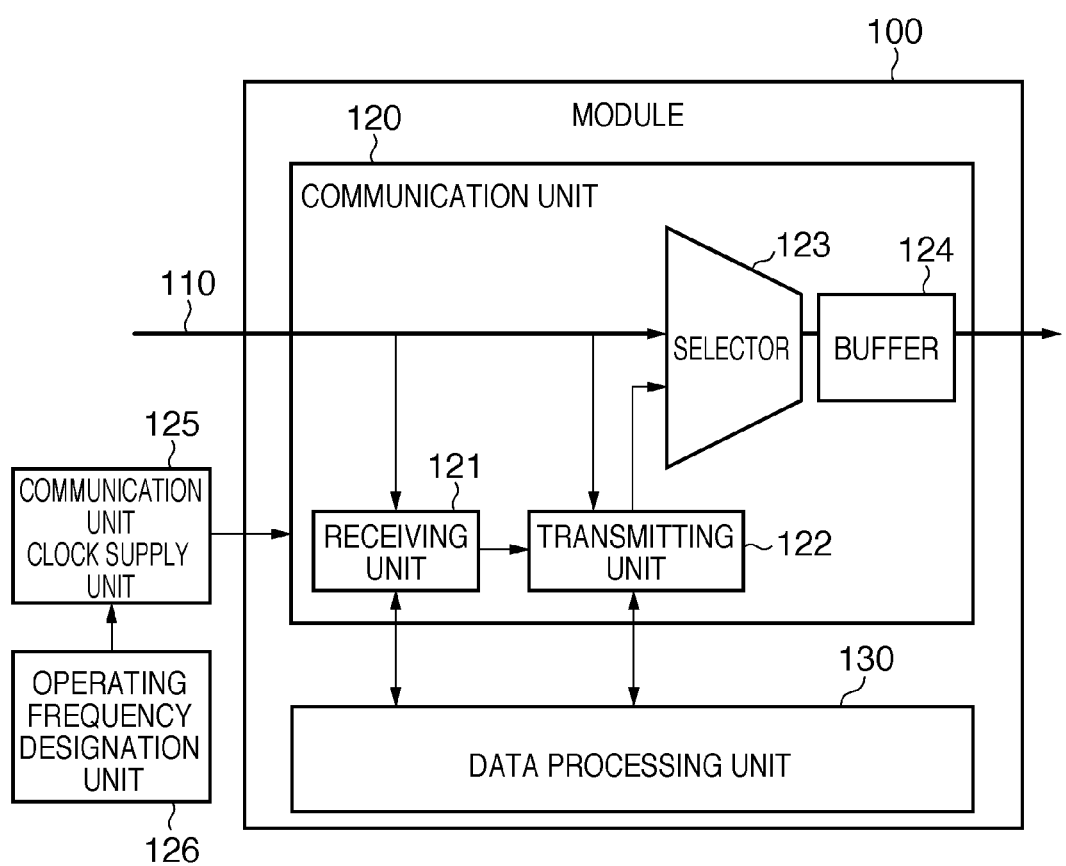
FIG. 1 is a block diagram showing the arrangement of a module connected to a ring bus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same continent elements, and a description thereof will not be repeated.

First Embodiment

FIG. 1 shows the arrangement of a module according to the first embodiment.

A single module 100 is connected to a ring bus. A ring bus 110 circulates data in a single direction. A communication unit 120 transmits/receives data between the ring bus and the module, and also holds a data packet flowing on the ring bus. A data processing unit 130 processes data received by the communication unit 120.

In the communication unit 120, a receiving unit 121 receives data to be processed by the module from data packets flowing on the ring bus. For data processed by the data processing unit 130 or data which will undergo some processing by the communication unit 120, a transmitting unit 122 generates a transfer packet and outputs it. A selector 123 selects and outputs, based on determination of the transmitting unit 122, one of a packet input from the ring bus 110 and a packet generated by the transmitting unit 122.

A buffer 124 temporarily holds the output from the selector 123. Temporarily holding data to be connected to the ring bus is done by the buffer 124. A communication unit clock supply unit 125 supplies a clock necessary for the operation of the communication unit 120. The communication unit clock supply unit 125 supplies, to the communication unit 120, a clock having a frequency designated by an operating frequency designation unit 126, which designates the operating frequency in accordance with an external setting.

Note that the clock frequency is often a multiple of an integer multiple of a specific original oscillation frequency or an integer fraction of the oscillation frequency, which is a commonly used technique. Additionally, in general, to avoid a problem associated with communication path synchronization, the original oscillation frequency is raised in advance, and control is performed to switch the frequency to a low one corresponding to an integer fraction or a factor of a power of 2. However, restrictions in implementing the generated frequencies are not directly relevant to the intention and effects of the present invention. Hence, in the description of the present invention, there are no restrictions imposed concerning the oscillation frequency and frequencies that can be designated in particular.

If a frequency calculated in the description of the embodiment does not exist as an actually selectable frequency, a frequency higher than and closest to the calculated frequency is selected and designated. This is to suppress a data delay on the communication path by raising the operating frequency of the communication path and thus increasing the apparent data amount that can be held on the communication path.

In addition to the communication unit clock supply unit 125 illustrated in FIG. 1, means for appropriately supplying clocks to the data processing unit and other components exist. However, these means are not illustrated because they provide no remarkable effect in the present invention. These clock supply means supply an operation clock (periodical signal for driving; to be simply referred to as a clock hereinafter) having a specific period (frequency). How each clock supply means corresponding to a processing means decides the operating frequency will not be mentioned in this embodiment. However, each clock supply means corresponding to a processing means supplies a clock independently of the communication unit clock supply means.

Figure 2A:
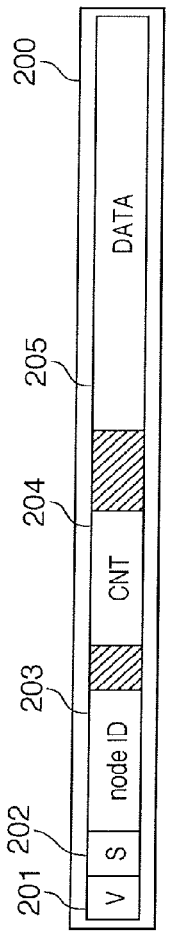
FIG. 2A is a view showing the format of packet data.

FIG. 2A shows the structure of a packet circulating through the ring bus. Reference numeral 200 denotes an entire packet. A valid flag 201 represents whether the packet is valid. A stall flag 202 represents that the packet cannot be received and is therefore put on hold. A node ID 203 indicates the transmission source of the data. A count value 204 represents the data transmission order. Reference numeral 205 denotes transmission data.

The operation of the ring bus in the example of the image process module 100 will be described below. When outputting data to the ring bus, first, the valid flag 201 of each input packet held in the buffer 124 of the ring bus is detected to search for an invalid packet (empty packet). If the valid flag 201 of an input packet indicates "valid", the input packet is stored in the buffer 124 and output to the ring bus at the next clock.

On the other hand, if the valid flag 201 of an input packet indicates "invalid", and there is outputtable data processed by the data processing unit of the module, the following packet is generated, held in the buffer 124, and output to the ring bus. More specifically, this packet is generated by adding, to the outputtable data, the valid flag 201 ("valid"), the stall flag 202 ("invalid"), the module ID of its own (node ID), and the count value of the number of output data. When the packet is output to the ring bus, the output counter is incremented.

On the data receiving side, the valid flag 201, node ID 203, and count value 204 of the input packet are monitored. Assume that a packet having the valid flag 201 indicating "valid", the node ID 203 matching a preset standby ID, and the count value 204 matching the input counter value is input. If the data processing unit 130 can receive data, the input packet is received by the data processing unit 130. After changing the valid flag 201 to "invalid", the packet is output to the next buffer. At this time, the counter for counting the number of input data is incremented, and the input counter value is updated.

If the data processing unit 130 in the module cannot receive data, the packet is output to the buffer 124 after changing only the stall flag 202 of the input packet to "valid" (that is, data reception is put on hold) without changing the remaining fields. Note that the input counter and the output counter are initialized to the same value before the start of data transfer to ensure synchronization.

Figure 2B:
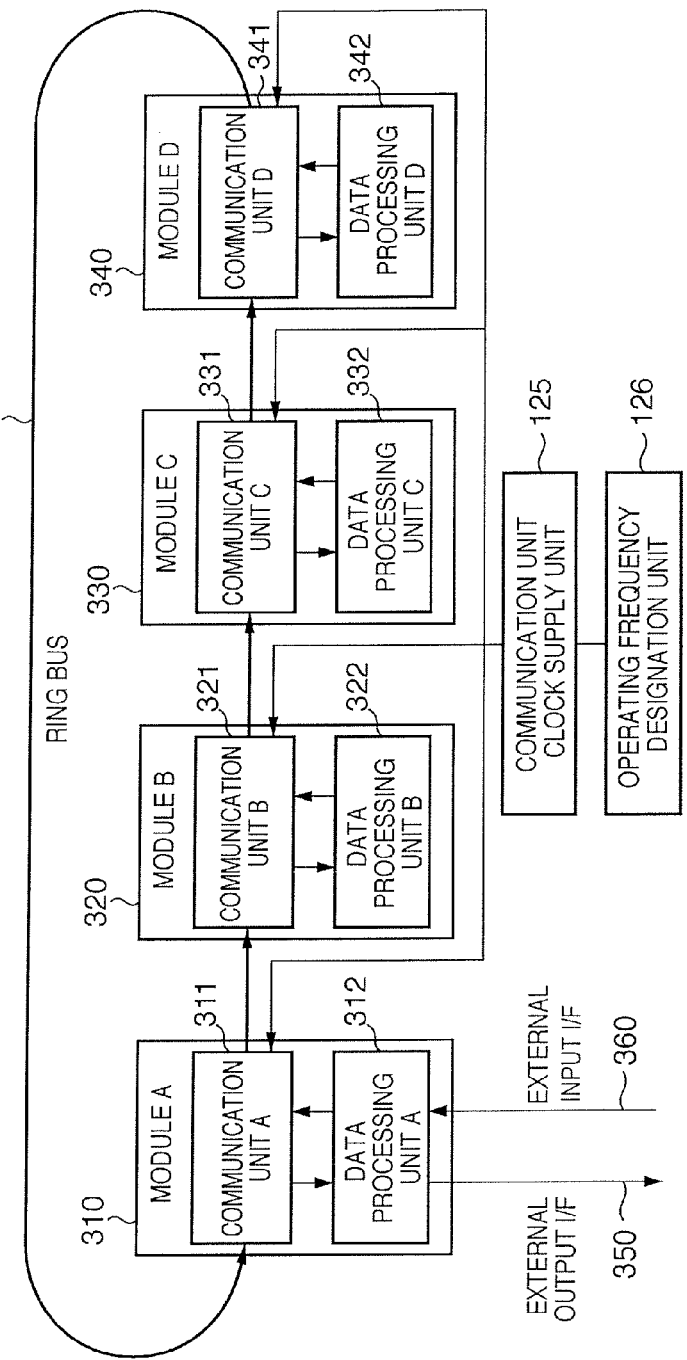
FIG. 2B is a block diagram showing the arrangement of a ring bus and a module using it.

FIG. 2B shows an arrangement example in which the ring bus is formed by connecting individual modules described with reference to FIG. 1. Reference numeral 300 denotes a ring bus. A terminal module 310 packetizes external data received through a connection 360 to an external data bus, and submits the packet to the ring bus 300. The terminal module 310 also has a function of extracting data that has undergone packet processing in a module connected to the ring bus, and externally outputting the packet via a connection 350 to the external data bus.

Modules 320, 330, and 340 are connected to the ring bus. The adjacent modules 310, 320, 330, and 340 respectively include communication units 311, 321, 331, and 341 each serving as a communication module that transmits/receives data to/from the ring bus, and data processing units 312, 322, 332, and 342 which perform processing for individual modules. The data processing units can perform either different processes for the respective modules or the same process for several modules.

A ring bus formed by four modules will be exemplified here. However, the number of modules that construct the ring bus is not particularly restricted; the ring bus may be formed using four or more modules. The communication unit clock supply unit 125 supplies a clock to the communication units 311, 321, 331, and 341 in accordance with an operating frequency preset by the operating frequency designation unit 126. The clock supply allows the communication units 311, 321, 331, and 341 and the data bus that connects the communication units to perform data communication in synchronism with the supplied clock.

Figure 3:
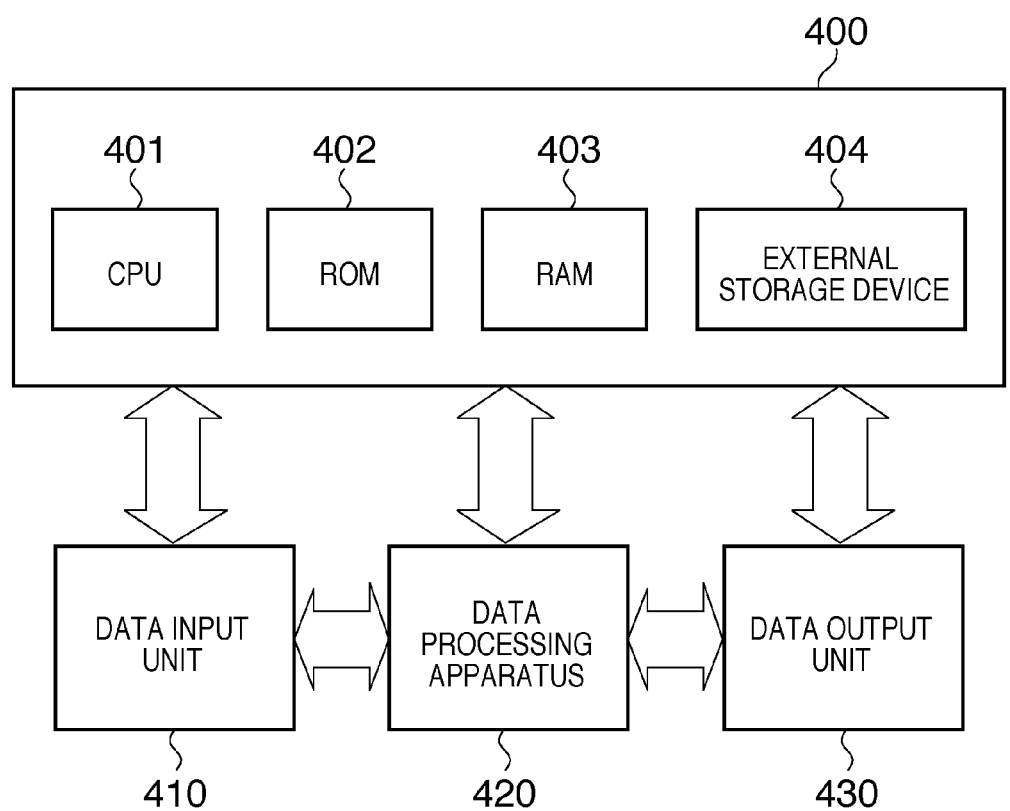
FIG. 3 is a block diagram showing the arrangement of a data processing system.

FIG. 3 shows an example of the arrangement of a system in which a data processing apparatus is arranged. A system control unit 400 includes a CPU 401 for calculation and control, a ROM 402 storing permanent data and programs, a RAM 403 to be used to temporarily store data or load programs, and an external storage device 404 which holds external data.

A data input unit 410 receives data to be processed from outside of the system or from the system control unit. The data input unit 410 may be an image reading apparatus formed from devices such as an image scanner and an A/D converter or a voice input apparatus formed from devices such as a microphone and an A/D converter. The data input unit 410 may be a DMA (Direct Memory Access) module which reads out data from the system control unit or a memory arranged outside, as a matter of course.

Reference numeral 420 denotes a data processing apparatus. A data output unit 430 outputs data processed by the system to the outside or the system control unit. For example, the data processing apparatus 420 may be an image output apparatus including a printer device that converts image data into a dot pattern and outputs it, or a voice output apparatus which outputs voice data via a D/A converter and the like. The data output unit 430 may be a DMA module which writes data in the system control unit or a memory arranged outside.

Data input to the data input unit 410 may be sent to the system control unit and processed by the CPU 401, or directly temporarily stored in the RAM 403 or the external storage device 404. Hence, the data processing apparatus 420 may directly receive input data from the data input unit 410 and process it, or perform processing in accordance with an instruction and data supply from the system control unit 400.

The output from the data processing apparatus 420 may be sent to the system control unit 400 again, or directly sent to the data output unit 430. The data processing apparatus 420 operates based on various kinds of data processing contents set and various process data supplied under the control of the system control unit 400.

Figure 4:
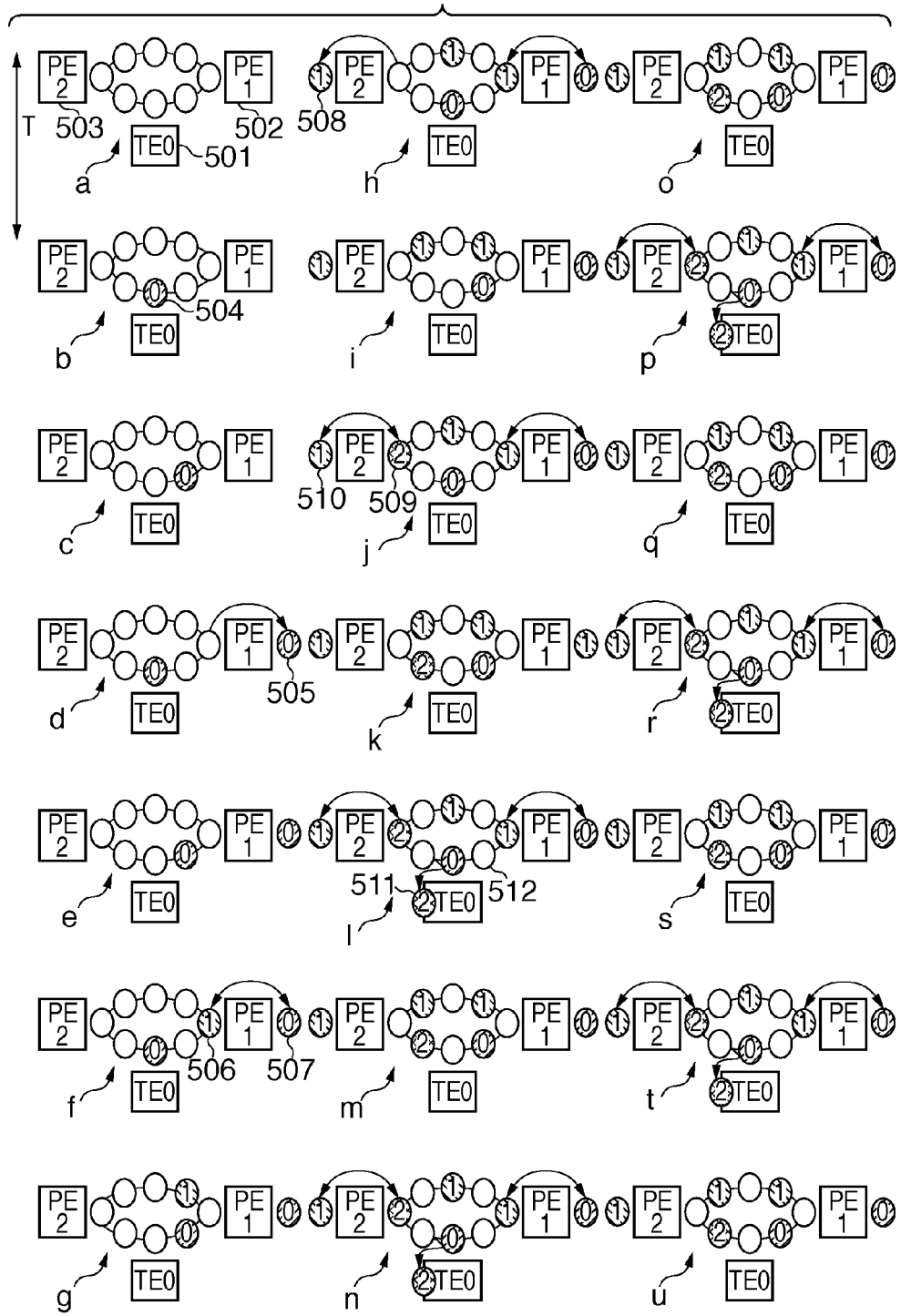
FIG. 4 is a view showing data transfer through the ring bus in accordance with a process order complying with a connection order.

An example of an operating frequency calculation method will be described next with reference to FIG. 4. Referring to FIG. 4, "a" represents a state wherein eight modules are connected to a ring bus. In the ring bus with this connection, data submitted from a data input/output module 501 (to be referred to as a "module TE0" hereinafter) to the ring bus is first processed by a data process module 502 (to be referred to as a "module PE1" hereinafter). After the processing, a data process module 503 (to be referred to as a "module PE2" hereinafter) processes and outputs the data. The process module use order is thus set in advance. Note that as shown in FIG. 4, the time necessary for data to move from "a" to "b" is defined as T. The data process time of each data module shown in FIG. 4 is uniformly assumed to be 2T.

That is, in this case, the process order complies with the connection order. The module TE0 corresponds to the module 310 in FIG. 2B. The modules 502 and 503 correspond to the modules 320, 330, and 340 in FIG. 2B. These process modules are simply illustrated for the description of the data operation in the ring bus.

In FIG. 4 that is an explanatory view of the embodiment, data is transferred through the ring bus counterclockwise in one direction. Data 504 is submitted first in "b" of FIG. 4 and then circulated through the ring bus counterclockwise, as indicated by "c" and "d" of FIG. 4. In "d" of FIG. 4, the module PE1 502 receives data 505 for processing.

In the description of this embodiment, the modules PE1 and PE2 end processing in 2T. Hence, in "f" of FIG. 4 after the elapse of 2T from "d" of FIG. 4, the module PE1 sends processed data 506 to the ring bus and instead receives next process data 507. After that, the processed data 506 sent from the module PE1 sequentially moves through the ring bus from "f" to "h" of FIG. 4. In "h" of FIG. 4, the module PE2 in its turn to process according to the process order receives process data 508. The data is similarly input from the module TE0, though the two movements between "g" and "h" of FIG. 4 are not illustrated.

The module PE2 also ends processing in 2T. After that, in "j" of FIG. 4, the module PE2 sends processed data 509 to the ring bus and instead receives next process data 510. The sent processed data 509 then moves through the ring bus from "j" to "l" of FIG. 4. When arriving at the module TE0, the processed data is output to the outside as output data 511.

As described above, when the process order is set based on the connection order, data is processed and output in one circulation. As indicated by "m" to "u" of FIG. 4, data are then output at the interval 2T. In addition, the ring bus always has four empty packets that transfer no data, like a packet 512. As can be seen from this, the ring bus can steadily transfer data while reserving the capacity.

In this case, one data flow steadily occupies four of the eight packets. Hence, when another data flow different from the above PE combination is formed in the ring bus, the ring bus uses its capacity 100%. That is, the ring bus can transfer two different data flows.

Figure 5A:
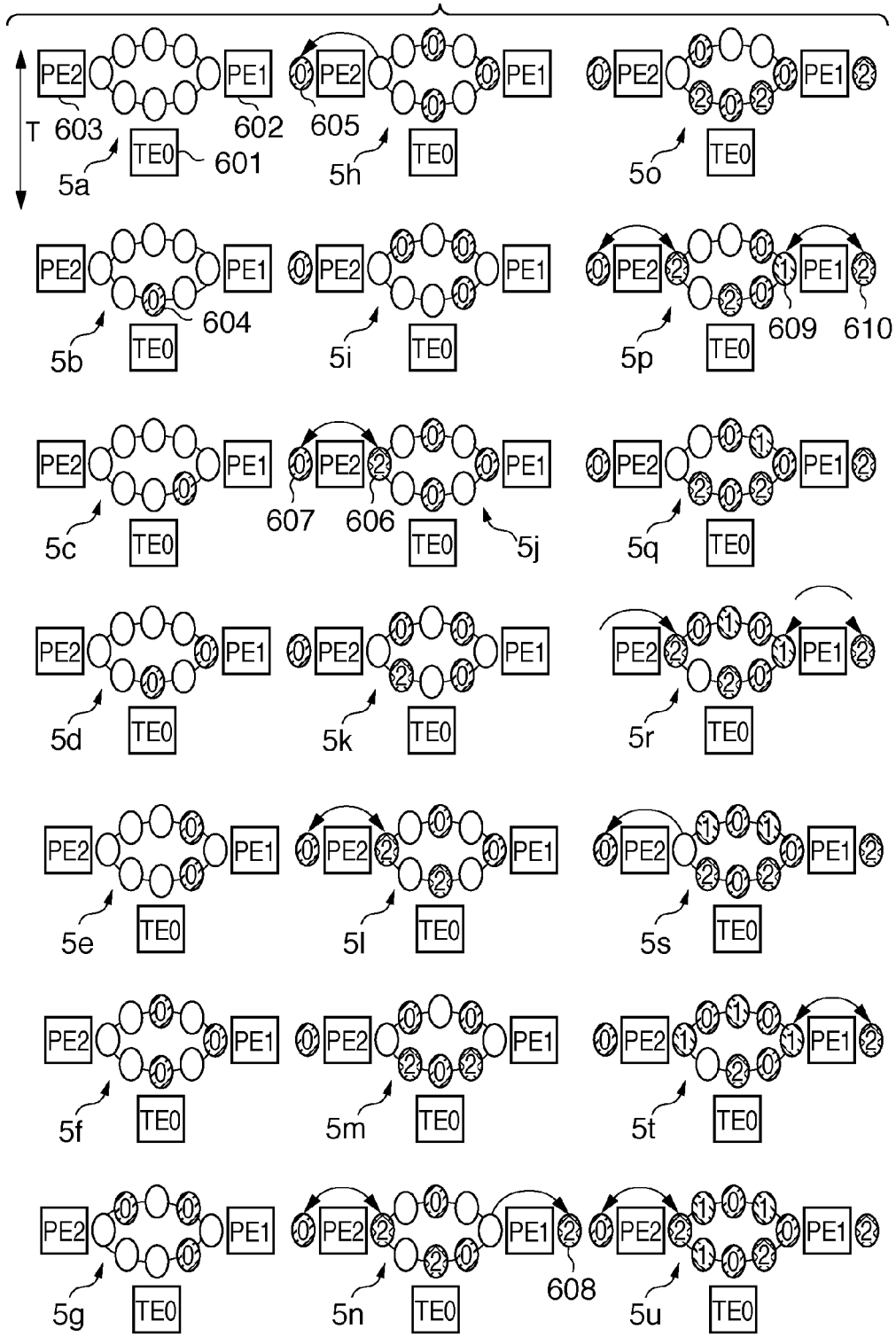
FIGS. 5A and 5B are views showing data transfer through the ring bus in accordance with a process order not complying with the connection order.

Another example of the operating frequency calculation method according to the present invention will be described next with reference to FIGS. 5A and 5B. Referring to FIG. 5A, "5a" represents a state wherein eight modules are connected to a ring bus. Assume that the ring bus with this connection performs processing in a process order different from that in FIG. 4. More specifically, data submitted from a data input/output module 601 (to be referred to as a "module TE0 (FIGS. 5A and 5B)" hereinafter) to the ring bus is first processed by a module 603 (to be referred to as a "module PE2 (FIGS. 5A and 5B)" hereinafter). After that, a module 602 (to be referred to as a "module PE1 (FIGS. 5A and 5B)" hereinafter) processes and outputs the data. The process order is thus designated in advance.

Data 604 is submitted first in "5b" of FIG. 5A and then circulated through the ring bus counterclockwise, as indicated by "5c" to "5h" of FIG. 5A. In "5h" of FIG. 5A, the module PE2 (FIG. 5A) receives data 605 for processing. The module ends processing in 2T, as described above. Hence, in "5j" of FIG. 5A after the elapse of 2T from "5h" of FIG. 5A, the module PE2 sends processed data 606 to the ring bus and instead receives next process data 607.

After that, the processed data 606 sent from the module PE2 moves through the ring bus from "5k" to "5n" of FIG. 5A.

In "5n" of FIG. 5A, the module PE1 (FIG. 5A) in its turn to process according to the process order receives process data 608. The module PE1 (FIG. 5A) also ends processing in 2T. After that, in "5p" of FIG. 5A, the module PE1 (FIG. 5A) sends processed data 609 to the ring bus and instead receives next process data 610.

Figure 5B:
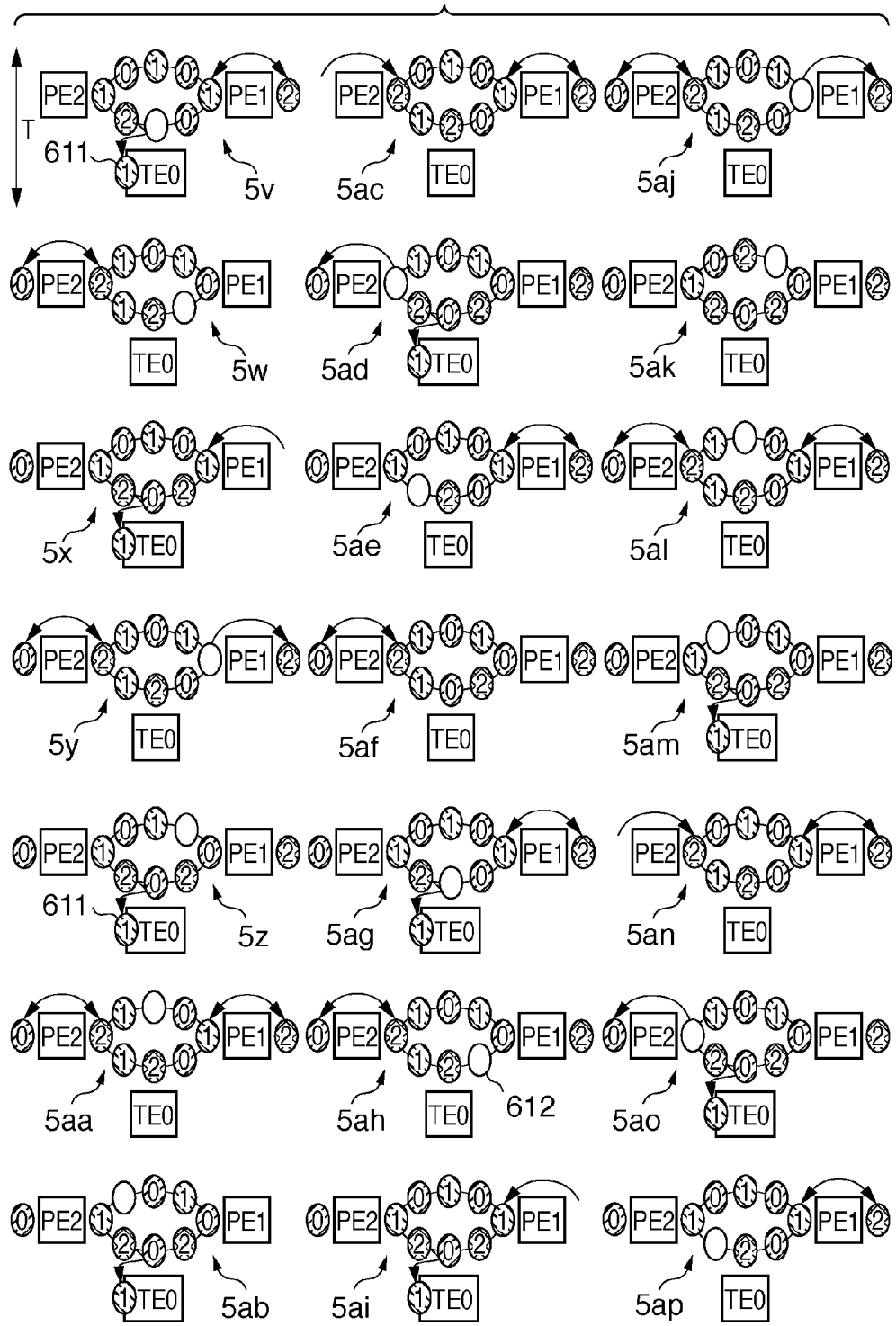

The sent processed data 609 then moves through the ring bus from "5q" to "5v" of FIGS. 5A and 5B. When arriving at the module TE0 (FIGS. 5A and 5B), the processed data 609 is output to the outside as output data 611. When processing data through such a path, the data transfer clock of the ring bus is given by the speed of transferring data to the immediately adjacent process module in the time T. At this time, in the steady state, only one empty transfer packet exists, as indicated by 612 in "5ah" of FIG. 5B. As is apparent from this, little data transfer capacity is left to the ring bus.

As described with reference to FIG. 4, when the process order complying with the connection order is designated, and each process module executes processing in 2T, data on the ring bus exists in every other packet. However, in the example shown in FIGS. 5A and 5B in which the reverse order is designated by changing the process order, data circulates twice through the ring bus and exits using almost all of the data holding capability of the ring bus. In this state, it is almost impossible to process another data flow. That is, since the band occupancy of the ring bus increases upon changing the process order, the process capability of the data processing apparatus halves. That is, the apparatus can process only a single data flow.

The present invention takes measures such that even when the reverse order is designated by changing the process order, two data flows can be processed like when using the normal process order. As a measure, the first embodiment discloses a technique of changing the clock frequency that decides the operation speed of the ring bus. More specifically, the data transfer clock frequency is raised as the number of data circulations through the ring bus up to the end of processing increases. That is, the transfer period is changed to be shorter.

Figure 6A:
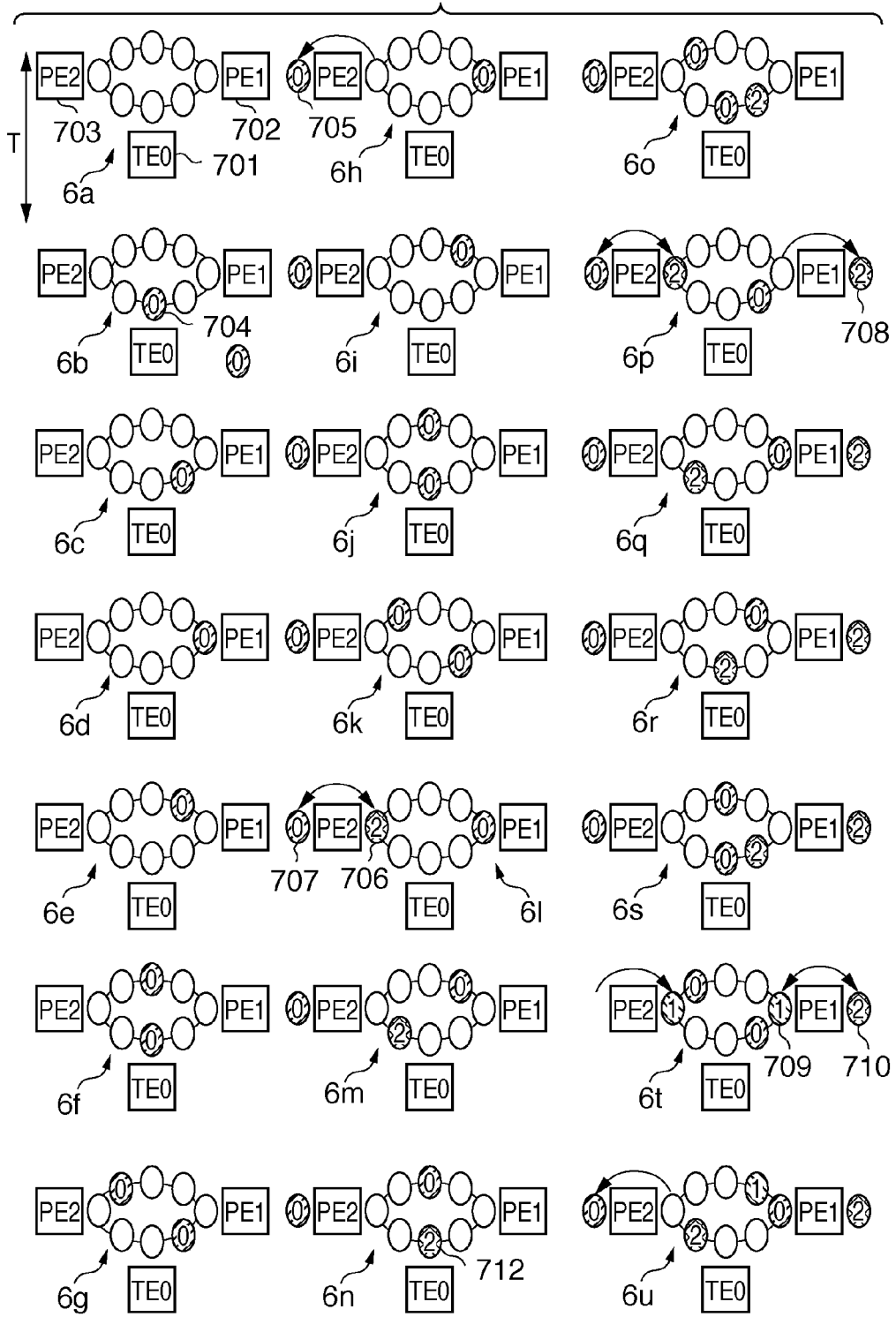
FIGS. 6A and 6B are views showing data transfer through the ring bus in accordance with the process order not complying with the connection order when the operation speed of the ring bus doubles.
Figure 6B:
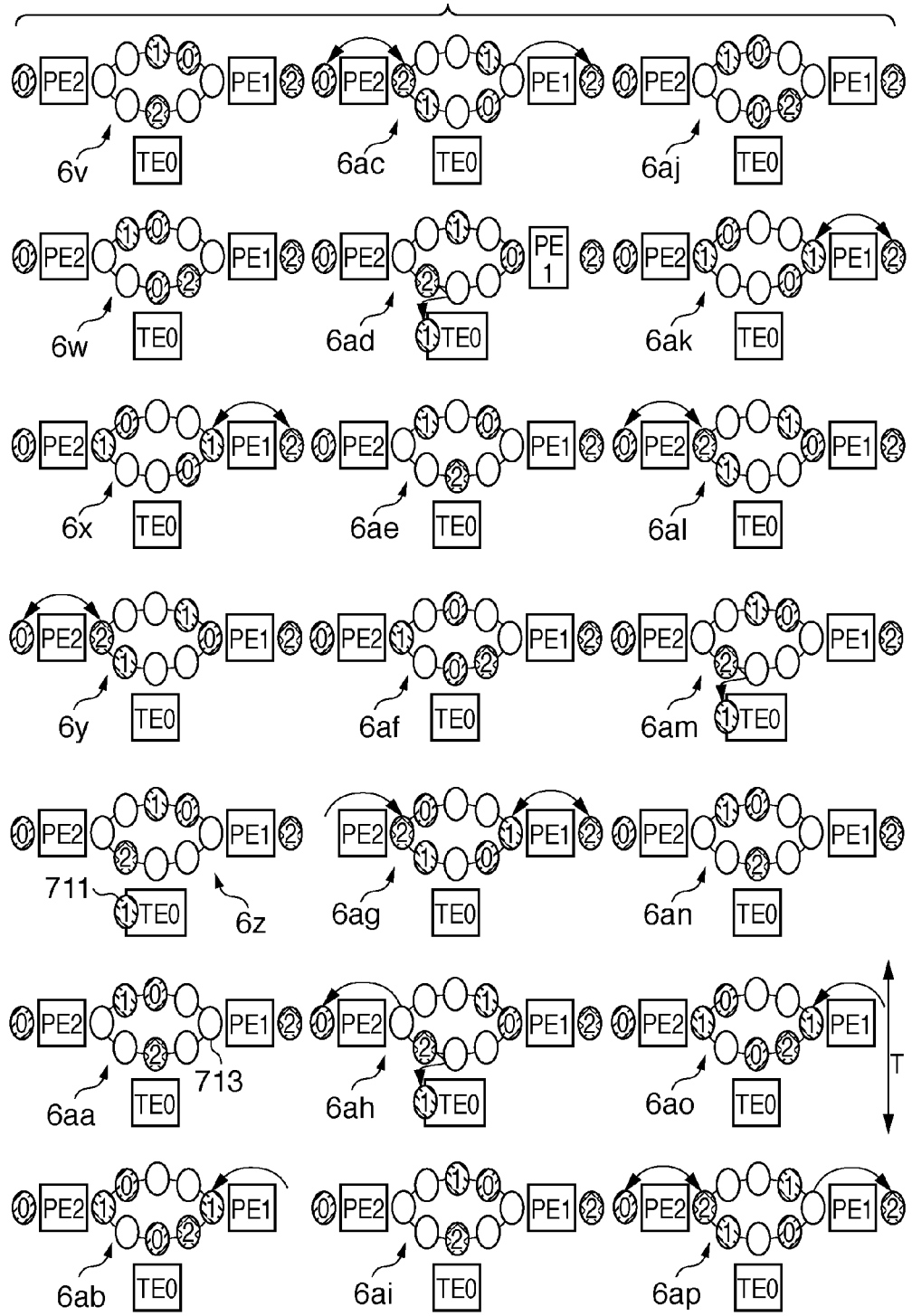
Figure 7A:
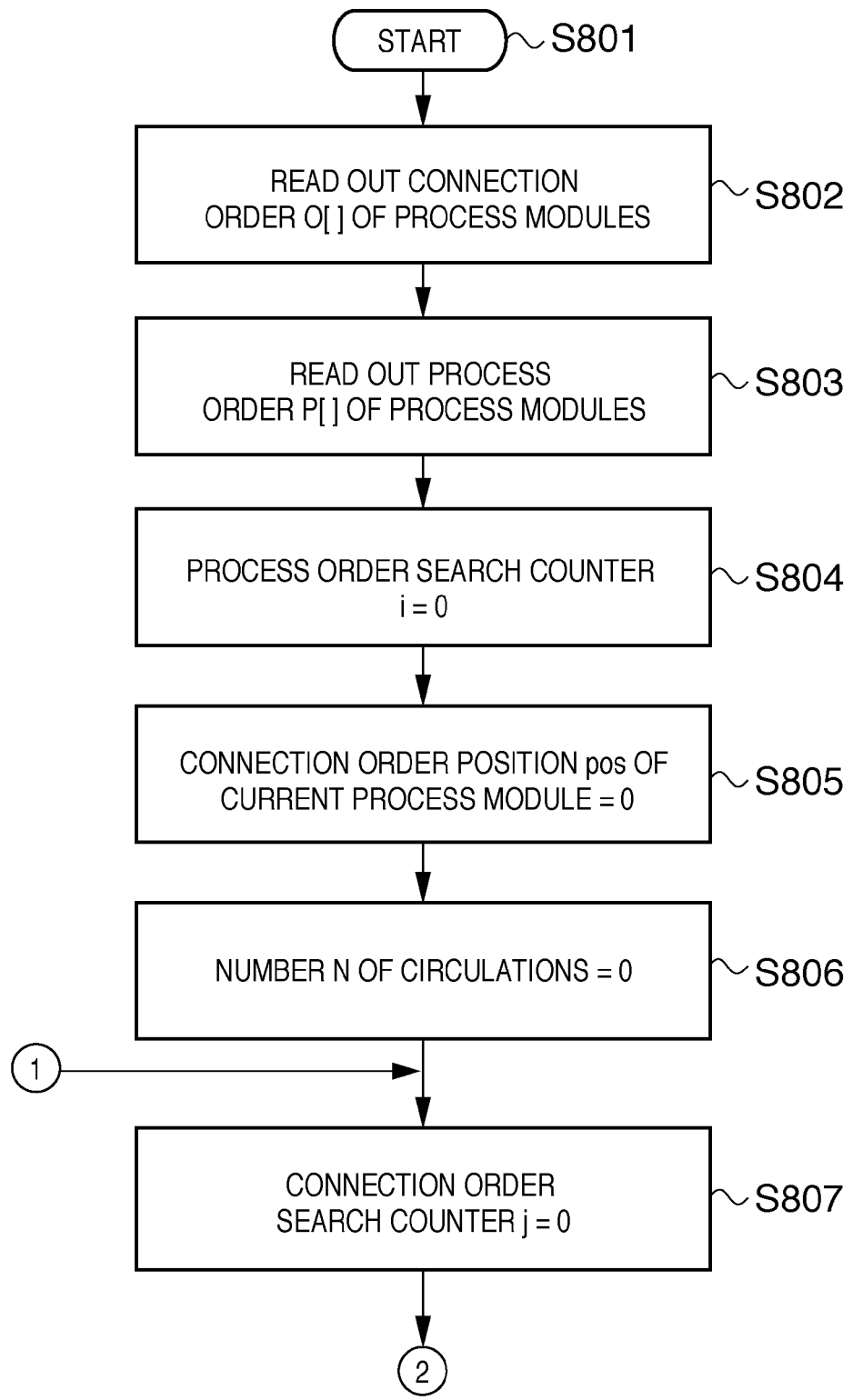
FIGS. 7A and 7B are flowcharts illustrating the processing procedure of ring bus operating frequency setting processing.
Figure 7B:
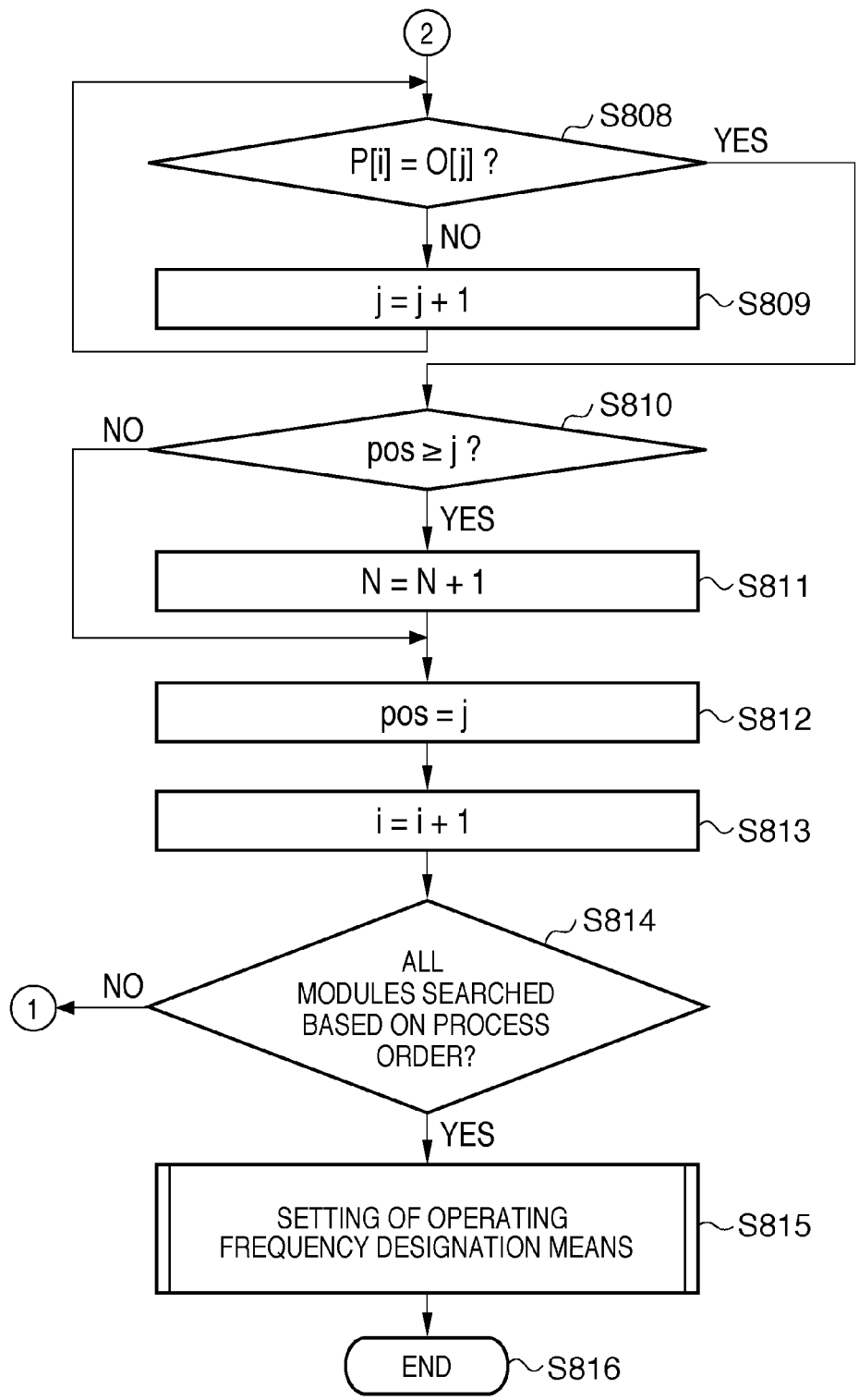

FIGS. 6A and 6B show an example in which the data transfer rate of the ring bus doubles. The doubled transfer rate is set based on an analysis result representing that when the process order is set to be opposite in direction to the data flow from the process module PE1 to the module PE2, input data circulates twice through the ring bus. When the transfer rate doubles, the time axis in FIGS. 7A and 7B is expressed by the double speed. For example, the elapse time from "6a" to "6b" is T in FIGS. 4 to 5B. In FIG. 6A, however, the time necessary for transfer is T/2, that is, ½ the transfer time T in FIG. 4 because the transfer rate of the ring bus doubles. However, since the clock frequency to be supplied to the process modules is not controlled, the ring bus operates at a speed four times higher than in the conventional process modules.

Referring to FIG. 6A, "6a" represents a state wherein eight modules are connected to a ring bus, as in FIGS. 4, 5A and 5B. In the ring bus with this connection, data submitted from a data input/output module 701 (to be referred to as a "module TE0 (FIG. 6A)" hereinafter) to the ring bus is first processed by a module 703 (to be referred to as a "module PE2 (FIG. 6A)" hereinafter). After that, a module 702 (to be referred to as a "module PE1 (FIG. 6A)" hereinafter) processes and outputs the data. The process order is thus designated in advance.

Data 704 is submitted first in "6b" of FIG. 6A and then circulated through the ring bus counterclockwise, as indicated by "6c" to "6h" of FIG. 6A. In "6h" of FIG. 6A, the process module PE2 (FIG. 6A) receives data 705 for processing. The process module ends processing in 2T, as described above. In this case, however, since the time necessary for data transfer is T/2, the state indicated by "6l" of FIG. 6A is obtained after the elapse of 2T from "6h" of FIG. 6A. At this point of time, the process module PE2 sends processed data 706 to the ring bus and instead receives next process data 707.

After that, the processed data 706 sent from the process module PE2 (FIG. 6A) moves through the ring bus from "6m" to "6p" of FIG. 6A. In "6p" of FIG. 6A, the module PE1 (FIG. 6A) in its turn to process according to the process order receives process data 708. The process data 708 has the same contents as those of the processed data 706.

The process module PE1 (FIG. 6A) 702 also ends processing in 2T. After that, in "6t" of FIG. 6A, the process module PE1 (FIG. 6A) sends processed data 709 to the ring bus and instead receives next process data 710. The sent processed data 709 then moves through the ring bus from "6u" to "6z" of FIGS. 6A and 6B. When arriving at the input/output module TE0 (FIGS. 6A and 6B), the processed data is output to the outside as output data 711.

Note that the input/output module TE0 (FIGS. 6A and 6B) submits data at the interval 2T, as in FIGS. 4, 5A and 5B. This creates a situation in which data is supplied in synchronism with the processing of the modules PE1 and PE2 (FIGS. 6A and 6B). In "6n" of FIG. 6A, however, processed data 712 passes just at the timing the module TE0 (FIGS. 6A and 6B) outputs data. Since it is impossible to put two data in one packet, data submission from the module TE0 (FIGS. 6A and 6B) delays by T/2. This delay leads to delay of output in "6am" of FIG. 6B by T/2 from the normal interval 2T. However, since four empty packets 713 shown in, for example, "6aa" of FIG. 6B exist almost always, the occupancy of data on the ring bus can be regarded as the same as in the example of FIG. 4.

As described above, when a process order that is the reverse of the connection order is designated, and data circulates twice through the ring bus, the clock that decides the operation speed of the ring bus is doubled to improve the data transfer capacity of the ring bus and thus obtain a capability of processing another data flow.

An example has been described above in which the process order reverse to the connection order is set in advance to circulate data twice through the ring bus. However, even when more data process modules join in with the processing, and the reverse process order to the connection order is set to circulate data N times through the ring bus, the data transfer capacity of the ring bus can be improved, as in FIGS. 6A and 6B. That is, when data circulates N times through the ring bus, the operation speed of the ring bus is increased to N times, thereby obtaining the same effect as described with reference to FIGS. 4 to 6B. One of the reasons why the operation speed of the ring bus is decided based on the number of data circulations through the ring bus is to save energy. More specifically, if the speed need not be higher, the operation speed of the ring bus is kept low, thereby saving power consumption of the entire system. For example, when the number of circulations is small, the frequency is changed to be lower (the period is changed to be longer). The number of circulations is a natural number.

In actual circuit implementation, if the clock is raised to be N times higher than the fundamental original oscillation frequency (periodical signal serving as a reference), the waveform of the clock may be blunted. To prevent this, for example, the fundamental clock is designed in advance to be N times higher than the normal clock by setting the upper limit of the number of circulations. If the number of circulations is small, the clock may be divided and supplied to control the operation to a low speed. This embodiment has disclosed changing the process speed of the ring bus in accordance with the number of circulations. However, whether the original oscillation frequency is set to N times or 1/N depends on the embodiment.

FIGS. 7A and 7B illustrates the processing procedure of causing the control device such as the CPU in FIG. 3 to instruct the operating frequency designation unit 126 in FIG. 1 which is provided in the data processing apparatus when the process order reverse to the connection order is set. In step S801, processing starts. In step S802, the CPU reads out connection order information O[n] of the process modules. For example, O[j] holds the ID of the jth connected module based on the connection order.

In step S803, the CPU reads out a process order P[n] designated in advance. For example, P[i] holds the ID of the module which is designated as the ith module to perform processing in the process order. In step S804, the CPU initializes a process order search counter i to 0. In step S805, the CPU initializes a variable pos that holds the ordinal number of the current process module based on the connection order to 0. Note that an ordinal number representing the connection order or process order is an integer of 0 or more. Normally, when the module connected first is represented by 0, {0,1,2, 3,4, ... } is defined as a sequence representing the connection order.

In step S806, the CPU initializes the number N of circulations to 0. In step S807, the CPU initializes a connection order search counter j to 0. In step S808, the CPU determines whether the process module represented by P[i] matches the process module represented by O[j]. If the process modules match, the process advances to step S810. If the process modules do not match, the process advances to step S809. In step S809, the CPU increments j by one, and the process returns to step S808. In step S810, the CPU compares the variable pos that holds the order of the current process module with j. If pos j, the process advances to step S811. Otherwise, the process advances to step S812.

In step S811, the CPU increments the number N of circulations by one. In step S812, the CPU substitutes j into pos. In step S813, the CPU increments i by one. In step S814, the CPU checks whether the search by the process order search counter i has been done for all modules complying with the process order designated in advance. If the search has ended, the process advances to step S815. Otherwise, the process returns to step S807.

In step S815, the CPU sets the frequency of the operating frequency designation unit 126 based on the obtained number N of circulations. For example, if the operating frequency designation unit 126 is implemented to set a frequency N times higher than the original oscillation frequency, N is set. If the operating frequency designation unit 126 is implemented to set a low frequency by dividing the original oscillation frequency, a frequency N/M is set, where M is the maximum number of circulations defined in the specifications. If the operating frequency designation unit is implemented to designate a frequency that takes discrete values, a designatable frequency not less than and closest to N/M is designated. After that, the process advances to step S816 to end the setting processing.

In this embodiment, as described above, using the obtained number N of circulations, the operating frequency that decides the data transfer rate of the ring bus is multiplied by N or divided into N/M using the maximum number M of circulations as well as N. The value of the number of circulations changes depending on how to implement the operating frequency designation unit 126 in FIG. 1 or setting of the original oscillation frequency, as described above. That is, the value of the number of circulations depends on implementation of the operating frequency designation unit 126.

In the first embodiment, an example has been described in which the operating frequency that decides the data transfer rate is controlled. However, the same effect can obviously be obtained by controlling the process speed on the side of each data process module. More specifically, when the number of data circulations is 2, the transfer rate of the ring bus doubles. Instead, the process speed on the side of each data process module may be halved without changing the transfer rate of the ring bus. Reducing the speed of the data process modules is done on limited occasions but yields the same effect as described above in terms of preventing any delay of data processing in the entire ring bus. Note that although in this embodiment the number of circulations is initialized to 0 for the convenience of processing, the number of circulations is basically handled as a natural number.

Second Embodiment

FIG. 8A shows the arrangement of process modules connected to a ring bus according to the second embodiment. The arrangement in FIG. 8A includes two new functional units in addition to the arrangement shown in FIG. 2B. One is a data circulation count measuring unit 901 which is connected to the ring bus and monitors valid data on the ring bus so as to count the number of circulations through the ring bus in a route where data undergoes processes designated in advance in a single data flow. The other is an operating frequency designation value calculation unit 902 which obtains a set value for an operating frequency designation unit 126 based on the number N of circulations detected and acquired by the data circulation count measuring unit 901.

The arrangement may also include a control signal connection 903 which sends, to the data circulation count measuring unit 901, a reset signal that triggers initialization and data flow identification information to be used for initialization in accordance with the timing of the start or end of a data flow. A reset signal that initializes the entire data processing apparatus or the like may exist throughout the data processing apparatus in accordance with normal implementation. In such reset control, implementation may be done to reset all numbers of data circulations upon resetting the entire data processing apparatus. The data circulation count measuring unit 901 may receive the initialization instruction directly from a system control unit 400 or a CPU 401 shown in FIG. 3. In this case as well, the system control unit 400 or the CPU 401 may control to selectively initialize only the number of circulations of a data flow that is starting or initialize all numbers of circulations. Alternatively, one of the two initialization methods may selectively be designated.

FIG. 8B shows an example of a data packet that holds information necessary for the data circulation count measuring unit 901 to detect the number of circulations of data belonging to a single data flow. The data packet holds data flow identification information F 1001 serving as information for identifying a data flow of different data processing in addition to the information described with reference to FIG. 2A.

Processing of causing the data circulation count measuring unit 901 to detect and decide the number of circulations using the data flow identification information F 1001 and a node ID 203 serving as the identification tag of the node of each module will be explained with reference to FIG. 9. In step S1101, processing starts. In step S1102, the data circulation count measuring unit initializes the number N[f] of circulations for a data path f to 0. In step S1103, the unit initializes all valid data process module counts COUNT[f][N] of all data process modules N to 0.

In step S1104, the unit waits for a data processing start trigger. When data processing starts, the process advances to step S1105. In step S1105, the unit checks input data. In step S1106, the unit determines whether the data is valid. If the data is valid, the process advances to step S1107. Otherwise, the process returns to step S1105.

In step S1107, the data circulation count measuring unit refers to COUNT[F][node ID] based on the node ID 203 and the data flow identification information F 1001 serving as the identification tag of the data flow. If the value is 0, the process advances to step S1108. Otherwise, the process advances to step S1109.

In step S1108, the unit increments the number N[F] of circulations by one. In step S1109, the unit substitutes 1 into COUNT[F][node ID], and the process returns to step S1105.

In this processing, the state of the ring bus is always monitored during the operation of the data processing apparatus. Hence, the above-described processing is repeated until the data processing apparatus is stopped or initialized again. Initialization may be done at the timing, for example, the data input/output unit starts or ends specific data processing. That is, the initialization need not always be performed at the timing the entire system or entire data processing apparatus is reset to activated.

The data circulation count measuring unit 901 in FIG. 8A monitors a plurality of data flows, as a matter of course. For this reason, when the initialization, that is, initialization of the number N of circulations in step S1102 is performed at the start or end of a specific data flow in a data input/output unit 310, the initialization may be enabled for each flow.

Figure 9:
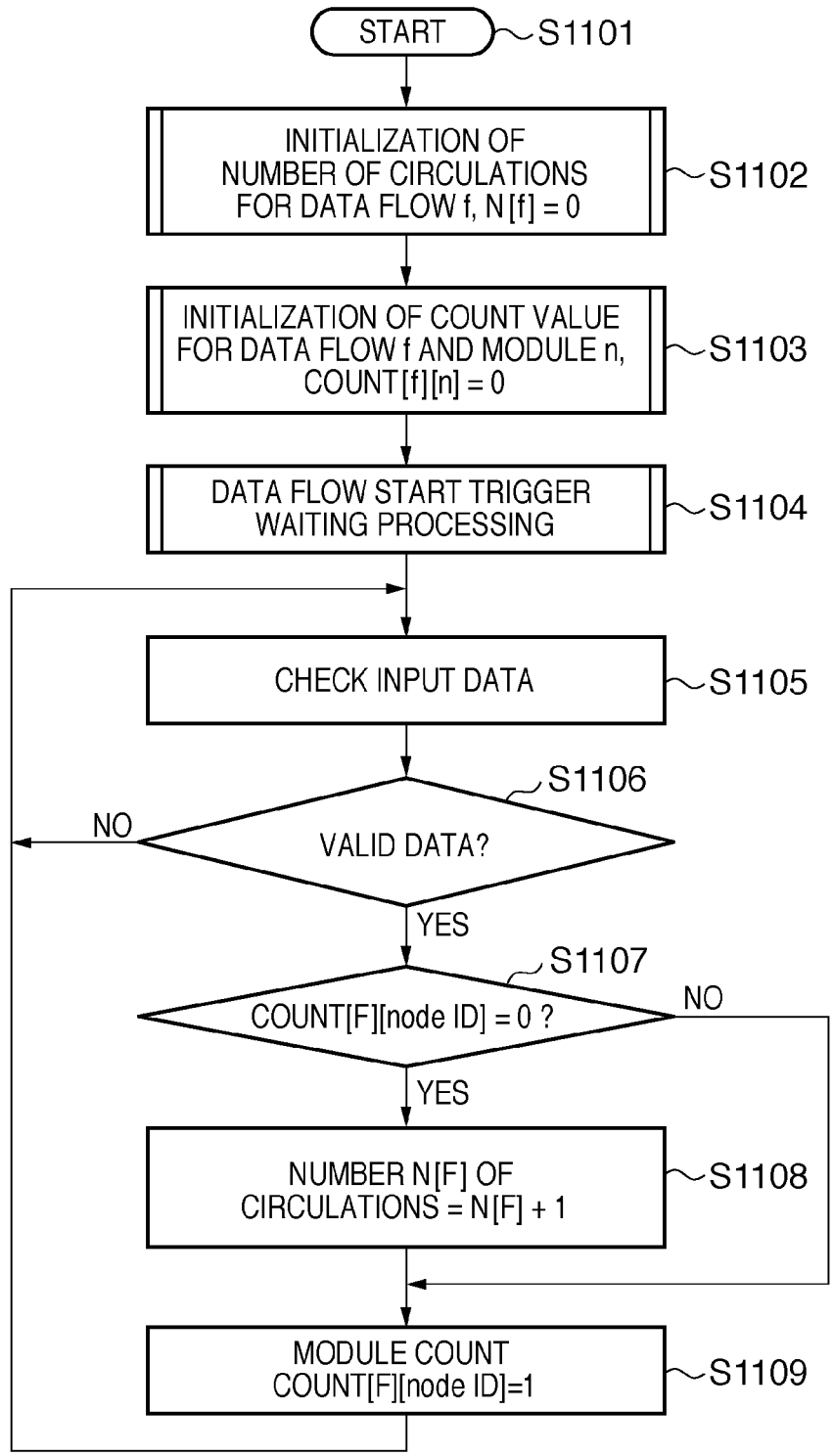
FIG. 9 is a flowchart illustrating the processing procedure of the data circulation count measuring unit of the ring bus.
Figure 11:
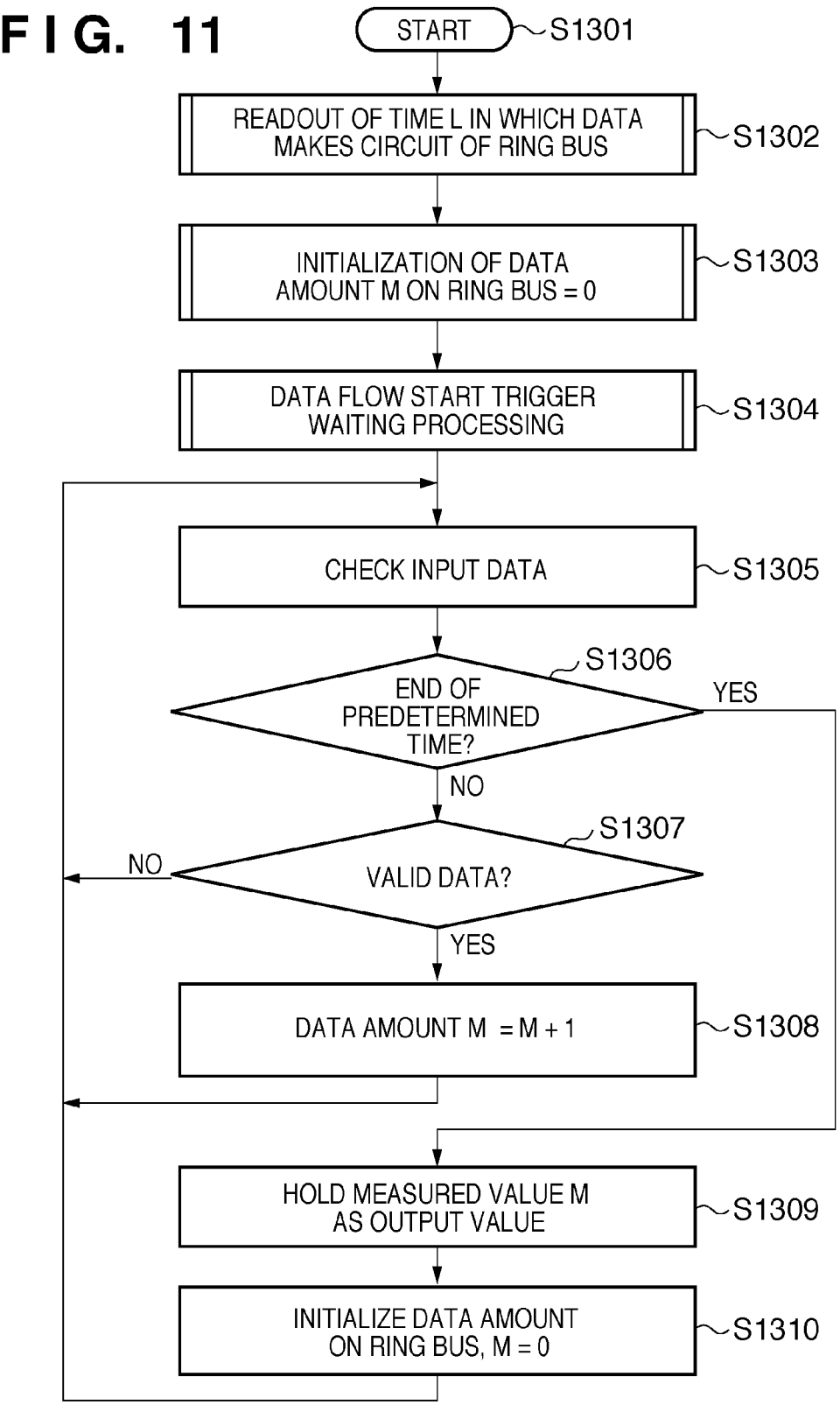
FIG. 11 is a flowchart illustrating the processing procedure of the data amount measuring unit of the ring bus.

In the processing procedure shown in FIG. 9, the number of circulations unique to each data flow is detected by incrementing the number of circulations by one for specific data with the data flow identification number F 1001 from a specific data process module. In the data processing, the amount of data output from a single data process module increases in accordance with the amount of processed data, as a matter of course. Hence, when continuous processed data from a module which has been counted once is counted, the count value indicates the processed data amount, as shown in the flowchart of FIG. 11 of the third embodiment to be described later.

To prevent this, for example, the number of circulations is counted based on the node ID 203 of data that passes through the data path of the ring bus and returns to the upstream again by the processing as disclosed in FIG. 9. This allows measurement of how data steadily circulates through the ring bus.

In the processing example shown in FIG. 9, the number of circulations is obtained separately for the data flow identification information F 1001. It is also effective to convert the sum of the numbers corresponding to all pieces of information F into the number of data circulations in the entire ring bus and use this value for control. This technique can be implemented by eliminating [f] and [F] in FIG. 9. In this case, however, the node ID 203 is assigned a value that causes no conflict among all data process modules connected to the ring bus. It is necessary to thus control to prevent any error in counting the number of circulations caused by repeating the node ID 203 of another data process module in counting.

As described above, the present invention discloses the processing shown in FIG. 9 as an example of the means for detecting the number of circulations. There may also be added processing of counting the number of circulations when a specific process module incapable of receiving data sets the stall bit and circulates the data put on hold. This processing can easily be implemented by, for example, monitoring the stall bit shown in FIG. 2A, and upon detecting setting of the bit, incrementing the number N[F] of circulations by a predetermined value or ratio. Alternatively, upon detecting setting of the stall bit, the flow ID, node ID, and counter value of the packet are held. When a packet having the same flow ID, node ID, and counter value has returned with its stall bit set, the number N[F] of circulations is further incremented, thereby easily accurately detecting the number of circulations.

Third Embodiment

Figure 10:
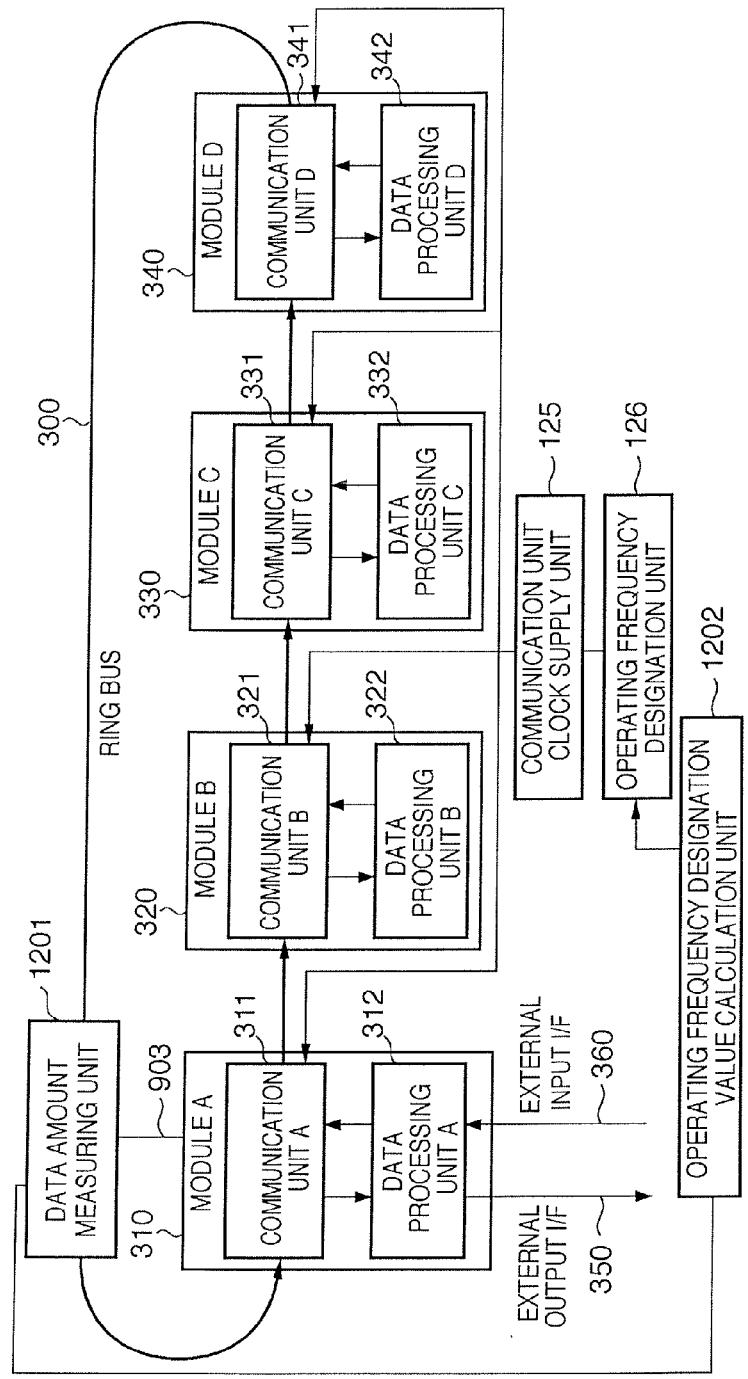
FIG. 10 is a block diagram showing the arrangement of a ring bus and modules connected to it.

FIG. 10 illustrates the arrangement of process modules connected to a ring bus according to the third embodiment.

The arrangement in FIG. 10 includes two new functional units in addition to the arrangement shown in FIG. 2B. One is a data amount measuring unit 1201 which is connected to the ring bus and monitors valid data on the ring bus so as to measure the amount of valid data per predetermined time through the ring bus. The other is an operating frequency designation value calculation unit 1202 which obtains a set value that decides the transfer rate of the ring bus based on a data amount M detected by the data amount measuring unit 1201. The set value is sent to an operating frequency designation unit 126.

As in the other embodiments, the reset signal that initializes the entire data processing apparatus or the like may exist throughout the data processing apparatus in accordance with normal implementation. In such reset control, implementation may be done to reset even the held data amount upon resetting the entire data processing apparatus. The data amount measuring unit 1201 may receive the initialization instruction directly from a system control unit 400 or a CPU 401 shown in FIG. 3.

FIG. 11 illustrates the processing procedure of measuring the data amount according to the embodiment. In step S1301, processing starts. In step S1302, the data amount measuring unit reads out a time L in which data makes round the ring bus. In step S1303, the unit initializes a variable M representing the data amount on the ring bus.

In step S1304, the unit waits for a data processing start trigger. Upon receiving the data processing start trigger, the process advances to step S1305. In step S1305, the unit checks input data. In step S1306, the unit determines whether a predetermined time has elapsed for the input data until checking the input data is valid. If the time has elapsed, the process advances to step S1309. Otherwise, the process advances to step S1307 to check whether the input data is valid. Whether or not the data is valid can be determined by checking a valid flag 201 shown in FIG. 2A. Upon determining that the data is not valid, the process returns to step S1305. If the data is valid, the process advances to step S1308.

In step S1308, the unit increments the valid data amount M by one. The process then returns to step S1305. On the other hand, if the predetermined time has elapsed in step S1306, the unit holds the measured value M as an output value in step S1309. In step S1310, the unit initializes the data amount M on the ring bus, and the process returns to step S1305.

This processing also continues until the data processing apparatus is stopped halfway or reset. In step S1309, in addition to the processing of holding, as the output, the valid data amount M measured per predetermined time, statistical processing of suppressing variations in measured values by, for example, averaging the held values of several past valid data amounts M may be executed. Alternatively, the measured value of one or two cycles later may be predicted from the past measured values using a specific prediction coefficient or the like, and held as the output.

The thus held output is read out by the operating frequency designation value calculation unit 1202 and compared with a standard data amount given to the ring bus per predetermined time. The operating frequency is set by increasing the operating frequency to an integer multiple or decreasing it to a fraction of an integer in accordance with the magnitude of the data amount measured value M. For example, when the valid data amount measured value M falls within the range from the value in the normal state (exclusive) to the double of the value in the normal state (inclusive), the operating frequency is doubled. Generally speaking, when the measured data amount exceeds the standard data amount or (N−1) (N is an integer of 2 or more) times of it and is equal to or smaller than the N times of the standard data amount, the operating frequency designation value calculation unit 1202 sets the operating frequency so as to multiply the data transfer rate between the process modules that perform processing through the ring bus by the integer N. Reversely, when the measured data amount falls below the standard data amount or 1/N (N is an integer of 1 or more) times of the standard data amount and is equal to or larger than 1/(N+1) times, the operating frequency designation value calculation unit 1202 sets the operating frequency so as to divide the data transfer rate between the process modules that perform processing through the ring bus by the integer N. This allows to improvement of the data processing efficiency. Note that the frequency conversion to N or 1/N times is merely an example. Conversion to, for example, $2^N$ or $\frac{1}{2}^N$ times may be easier from the viewpoint of the hardware configuration. As described above, the present invention intends to increase the frequency when the data amount increases, or decrease the frequency when the data amount decreases. Any simply increasing or decreasing function is usable as the operational expression.

In the actual operation, the waveform may be distorted by frequent operating frequency switching, leading to errors in data processing. To prevent this, the operating frequency designation value calculation unit 1202 may immediately execute raising the operating frequency but control the operating frequency lowering instruction using predetermined hysteresis processing or the like so as to suppress frequent operating frequency switching.

Fourth Embodiment

In this embodiment, an example will be described in which when designating the operating frequency for an operating frequency designation unit 126, a system control unit 400 obtains and designates the set value based on the number F of data flows a data processing apparatus 420 is instructed to simultaneously execute.

As shown in FIGS. 6A and 6B of the first embodiment, when the data transfer rate of the ring bus doubles, half of the packets become empty, and the data holding capability of the ring bus can be reserved. As is apparent from this, raising the operating frequency enables to increase the amount of data flowing through the ring bus.

On the other hand, when a plurality of data flows are set in the ring bus, the amount of data flowing through the ring bus increases, as a matter of course. The system control unit can grasp the number F of data flows to be simultaneously executed by the data processing unit. Hence, the system control unit may control to, for example, set the operating frequency of the ring bus to F times of the preceding frequency based on the grasped number F of data flows.

Actually, when the process order is the reverse of the connection order, the amount of data flowing through the ring bus changes, as described with reference to FIG. 4 or 5. For this reason, how to set the frequency cannot be determined based on only the number F of data flows. However, when using the ring bus for the operation, specifying the number of circulations through the ring bus in processing not complying with the connection order allows to control in proportion to the number F of flows.

For example, as shown in FIGS. 6A and 6B of the first embodiment, when the process order reverses only once, and two data flows that circulate twice through the ring bus are to be processed simultaneously, the frequency that decides the transfer rate may be set to, for example, 2×F times based on the number F of data flows and the number of data circulations "2". This makes it possible to implement transfer rate change considering both the number N of data circulations and the number F of data flows.

In the example shown in FIGS. 6A and 6B, since both the data process modules 702 and 703 require the process time 2T, the operating frequency may be set to F times by dividing 2F described in the fourth embodiment by 2. In the fourth embodiment, the appropriate set value of the operating frequency may be decided by combining the parameters including the number N of data circulations, the number F of data flows to be processed simultaneously, and the process time 2T of the data process modules, thereby obtaining the set value for the operating frequency designation means.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-032902, filed Feb. 17, 2010, which is hereby incorporated by reference herein in its entirety.

What is claimed is:

1. A data processing apparatus which circulates a packet on a ring bus by connecting a plurality of communication modules to the ring bus and causing each communication module to send the packet to an adjacent communication module in synchronism with a predetermined periodical signal, comprising:

a plurality of data process modules each connected to a corresponding one of the plurality of communication modules to process data held in the packet;

an input/output module connected to at least one of the plurality of communication modules to receive/output data from/to the communication module;

an acquisition unit configured to acquire the number of circulations of data through the ring bus until the data completes predetermined processing and is received by said input/output module, the data being input from said input/output module to one of the communication modules; and a change unit configured to change a frequency of the periodical signal in accordance with the number of circulations.

2. The apparatus according to claim 1, wherein said change unit changes the frequency to a higher frequency as the number of circulations increases.

3. The apparatus according to claim 1, wherein said change unit changes the frequency to a lower frequency as the number of circulations decreases.

4. The apparatus according to claim 1, further comprising a clock supply unit configured to supply the periodical signal serving as a reference to the plurality of communication modules, Wherein the change unit changes the frequency of the periodical signal based on the periodical signal serving as the reference and the number of circulations acquired by said acquisition unit.

5. The apparatus according to claim 1, wherein said input/output module packetizes data and sends the packet to the ring bus, and receives the data that has undergone the predetermined processing by said plurality of data process modules.

6. The apparatus according to claim 1, wherein said acquisition unit calculates the number of circulations from a use order and an arrangement order of said plurality of data process modules.

7. The apparatus according to claim 1, wherein said acquisition unit counts the number of circulations of the input data through the ring bus.

8. The apparatus according to claim 1, wherein said change unit shortens a period by setting the frequency that decides the period to a frequency multiplied by the number of circulations.

9. A data processing apparatus which circulates a packet on a ring bus by connecting a plurality of communication modules to the ring bus and causing each communication module to send the packet to an adjacent communication module in synchronism with a predetermined periodical signal, comprising:

a plurality of data process modules each connected to a corresponding one of the plurality of communication modules to process data held in the packet;

an input/output module connected to at least one of the plurality of communication modules to receive/output data from/to the communication module;

a measuring unit configured to measure an amount of data flowing through the ring bus; and a change unit configured to change a frequency of the periodical signal based on the data amount measured by said measuring unit.

10. A method of controlling a data processing apparatus which circulates a packet on a ring bus by connecting a plurality of communication modules to the ring bus and causing each communication module to send the packet to an adjacent communication module in synchronism with a predetermined periodical signal, comprising:

a plurality of data processing steps of causing data process modules each connected to a corresponding one of the plurality of communication modules to process data held in the packet;

an input/output step of receiving/outputting data from/to at least one of the plurality of communication modules;

an acquisition step of acquiring the number of circulations of data input in the input/output step through the ring bus until the data completes predetermined processing and is output; and a change step of changing a frequency of the periodical signal in accordance with the number of circulations.

* * * * *